United States Patent Office 2,989,374
Patented June 20, 1961

---

2,989,374
PREPARATION OF DECABORANE
Joseph A. Neff, Arcadia, Calif., assignor, by mesne assignments, to Olin Mathieson Chemical Corporation, a corporation of Virginia
No Drawing. Filed June 13, 1956, Ser. No. 591,247
2 Claims. (Cl. 23—204)

This invention relates to the preparation of decaborane and, in particular, provides a method for the production of decaborane from tetraborane by the controlled pyrolysis of tetraborane under pressure.

Decaborane is a stable, white, crystalline material with a melting point of 99.5° C. Its boiling point is 213° C. at atmospheric pressure and its density is 0.94 g. per cc. at 25° C. The vapor pressure of this compound at 100° C. is 19.0 mm. of mercury.

Decaborane is a boron hydride of very high boron content and has a very high heat of combustion, indicating its utility as a high energy fuel. It is an extremely valuable material for the preparation of liquid fuels. Methods for the preparation and utilization of such liquid fuels is described in Altwicker, Garrett, Harris and Weilmuenster application Serial No. 497,407, filed March 28, 1955.

A great number of processes for the production of decaborane from diborane have been proposed. In the majority of these processes it has been proposed to produce decaborane by the thermal treatment of or pyrolysis of diborane at substantially atmospheric pressure. The conversion of diborane to decaborane at moderately elevated temperatures, at which temperature most of the volatile boranes will undergo polymerization to form boranes of higher molecular weight, appears to be quite complex and the reaction mechanisms still are not completely understood. In carrying out a process for the production of decaborane involving the pyrolysis of diborane at moderate temperatures, a complete range of boron hydrides, including the higher molecular weight solid products, is produced. A major disadvantage of the processes proposed previously is that the production of high molecular weight solid boron hydrides which invariably accompanies the formation of decaborane in such processes represents a loss of valuable diborane from the process and a consequent reduction in yield of the desired decaborane. These solid products are extremely inert and at the present state of the art there is no method for converting them into useful materials. Another important disadvantage of the pyrolysis processes for the production of decaborane from diborane is that a number of boron hydrides are produced and the conversion to the desired decaborane is extremely small.

There is a need in the art, therefore, for a process to produce decarborane which greatly reduces the formation of undesirable solid products with the consequent reduction in yield and which gives high conversions of the starting boron hydride to the desired decaborane.

By the process of this invention tetraborane, which can be conveniently produced in the manner described in Faust and Roscoe application Serial No. 553,429, filed December 16, 1955, now abandoned, can be converted to decaborane by pyrolysis of the tetraborane at moderate temperatures and pressures to give high yields of decaborane. With this process the production of undesirable solid boron hydrides of high molecular weight is almost completely avoided.

The following examples illustrate various embodiments falling within the scope of this invention and are to be considered as not limitative.

EXAMPLE I

In this experiment an autoclave was used. This reactor, which was 9/16 inch in outside diameter and 5/16 inch in inside diameter, was approximately 10 inches long and had about 8 to 10 ml. of free space. A 20,000 p.s.i. steel gauge was attached to the safety head assembly of the autoclave and was used to measure the pressure. In order to eliminate free space in the gauge it was attached to the safety head assembly in an inverted position and filled with mercury. The autoclave was equipped with a stirrer which was activated by two solenoid coils held in place around the outside of the reactor. A stirring timer controlled the mixing speed. The autoclave was also equipped with appropriate side arm tube connections and valves which allowed the apparatus to be evacuated or pressured with various gases as desired.

In this experiment 1.78 g. of tetraborane, measured by expanding into a calibrated vacuum line, was condensed into the reactor which had previously been cooled to −196° C. by means of liquid nitrogen. The reactor and charged tetraborane were permitted to warm up to room temperature and nitrogen was pressured into the autoclave until a pressure of 1750 p.s.i.g. was reached. The reactor was then heated to about 65° C. for 2½ hours by placing a bath of boiling methanol around the reactor. During the reaction period the maximum pressure developed was 3900 p.s.i.g. At the end of the reaction period the reactor was cooled with liquid nitrogen, attached to a vacuum line and the hydrogen formed during the reaction was pumped off.

In the next step the reactor was allowed to warm up and volatile products from the reactor were trapped in a bath cooled to −196° C. by liquid nitrogen. The volatile products then were fractionated through a series of three traps maintained at −78° C., −130° C. and −196° C. respectively. Pentaborane(9) and pentaborane(11), along the some tetraborane, were retained in the −78° C. trap. The remainder of the unreacted tetraborane was trapped in the −130° C. trap while the diborane produced in the reaction was collected in the trap maintained at −196° C. All of the volatile samples were expanded into measured volumes and samples of the gases so produced were analyzed by infrared methods. In this example 0.66 g. of tetraborane was recovered along with 0.55 g. of diborane. The reactor was opened up in an inert atmosphere and the solids which had formed during the reaction were extracted with 36 ml. of methylcyclohexane. Infrared analysis of the liquid indicated that 0.41 g. of decaborane had been produced. Solids and other losses amounted to 0.16 g. in this experiment. The conversion of tetraborane was 62.8 percent and the yield of decaborane was 39.5 percent based on the tetraborane converted.

Decaborane of high purity can be conveniently recovered from the decaborane-methylcyclohexane solution by first removing the solvent, methylcyclohexane, by vacuum evaporation followed by recovery of pure decaborane by sublimation from the resulting solids.

A number of additional experiments were performed in a similar manner utilizing the same apparatus. Experiments are tabulated in Table I which appears below.

Table 1

| Example No. | II | III | IV | V | VI | VII | VIII | IX | X |
|---|---|---|---|---|---|---|---|---|---|
| $B_4H_{10}$ in (g.) | 1.78 | 1.76 | 1.48 | 1.53 | 1.54 | 1.92 | 1.95 | 1.9 | 1.9 |
| Inert Diluent | Nitrogen | Nitrogen | Nitrogen | Nitrogen | Argon | Argon | Argon | Nitrogen | Helium |
| Init. Pressure (p.s.i.g.) | 1,750 | 1,900 | 1,000 | 1,250 | 2,350 | 1,950 | 2,500 | 2,050 | 2,150 |
| Reaction Temp., °C | 65 | 56 | 56 | 56 | 56 | 56 | 56 | 56 | 56 |
| Max. Press. (p.s.i.g.) | 3,950 | 2,450 | 1,800 | 2,550 | 3,250 | 2,750 | 3,250 | 2,950 | 3,150 |
| Materials Out: | | | | | | | | | |
| $B_2H_6$ | 0.55 | 0.21 | 0.17 | 0.32 | 0.16 | 0.25 | 0.23 | 0.25 | 0.42 |
| $B_4H_{10}$ | 0.66 | 1.31 | 0.78 | 0.59 | 0.74 | 1.38 | 1.49 | 1.38 | 1.31 |
| $B_5H_9$ | | | 0.24 | 0.15 | 0.55 | trace | trace | trace | trace |
| $B_{10}H_{14}$ | 0.41 | 0.20 | 0.16 | 0.38 | 0.10 | 0.13 | 0.12 | 0.14 | 0.24 |
| Solids and Losses (g.) | 0.16 | 0.03 | 0.13 | 0.09 | none | 0.16 | 0.11 | 0.13 | none |
| Reaction Time (hrs.) | 2½ | 1 | 1 | 3 | 1 | 1 | 1 | 1 | 1 |
| Percent Conversion of $B_4H_{10}$ | 62.8 | 25.4 | 47.3 | 61.4 | 51.9 | 28.1 | 23.6 | 27.4 | 31.1 |
| Percent Yield of $B_{10}H_{14}$ | 39.5 | 48.8 | 26.7 | 43.8 | 13.6 | 26.3 | 28.5 | 29.3 | 44.3 |

EXAMPLE XI

In this example, which was performed in the same autoclave as described in Example I, 2.09 g. of tetraborane, measured by expanding the gas into a calibrated volume, was condensed into the autoclave which had previously been cooled to −196° C. The tetraborane was pyrolyzed for a period of 4 hours and 15 minutes at a temperature of 66° C. The maximum pressure attained during the reaction period was 2000 p.s.i.g. At the conclusion of the reaction period the autoclave was cooled to −196° C. by immersion in a bath of liquid nitrogen and, after being attached to a vacuum line, hydrogen formed during the reaction was pumped off. In the next step the reactor was allowed to warm up and the volatile products from the reactor were trapped in a trap maintained at −196° C. The volatile products were then fractionated through a series of three traps maintained at −78° C., −130° C. and −196° C. respectively. Pentaborane(9) and pentaborane(11), along with some tetraborane, were in the −78° C. trap. The remainder of the unreacted tetraborane was trapped in the −130° C. trap while diborane was collected in the −196° C. trap. All of the volatile samples were expanded into measured volumes and a sample of the gases so produced analyzed by infrared methods.

In this example there was recovered 0.123 g. of pentaborane, 0.29 g. of tetraborane, 0.712 g. of diborane, 0.085 g. of hydrogen and 0.57 g. of decaborane.

The reactor was opened in an inert atmosphere and the solids which had been formed extracted with 57 ml. of methylcyclohexane. Infrared analysis of the liquid indicated that 0.57 g. of decaborane had been produced. The conversion of tetraborane was 86 percent and the yield of decaborane was 34 percent based on the tetraborane used.

EXAMPLE XII

A total of 1.17 g. of tetraborane, measured by expanding the gas into a calibrated vacuum line, was condensed into the autoclave which had previously been cooled to −196° C. by immersion in a bath containing liquid nitrogen. For 2 hours and 30 minutes the tetraborane was pyrolyzed at a temperature of 66° C. The maximum pressure attained during the reaction period was 1600 p.s.i.g. At the end of the reaction period the autoclave was cooled by liquid nitrogen, attached to a vacuum line and the hydrogen formed during the reaction was pumped off. The reactor was then allowed to warm up and the volatile products isolated in a trap maintained at −196° C. In the next step the volatile products were fractionated through three traps maintained at −78° C., −130° C. and −196° C. respectively. Pentaborane(9) and pentaborane(11) and some tetraborane were retained in the −78° C. trap while the remainder of the unreacted tetraborane was retained in the −130° C. trap. Diborane was collected in the −196° C. trap. All of the volatile samples were expanded into measured volumes and a sample of the gases so produced analyzed by infrared methods.

In this example 0.018 g. of tetraborane was recovered along with 0.45 g. of diborane. The reactor was opened in an inert atmosphere and the solids which had been formed during the reaction were extracted with 63 ml. of methylcyclohexane. An infrared analysis of the liquid indicated that it contained 0.315 g. of decaborane. In this experiment the conversion of tetraborane was 98.5 percent and the yield of decaborane based on the tetraborane converted was 28.3 percent.

Various modifications can be made in the procedures of the specific examples to provide other embodiments which fall within the scope of this invention. The pyrolysis reaction can be carried out at a temperature between 40° C. and 90° C., preferably at a temperature between 50° C. and 70° C. Also, the pressure can vary from 1000 p.s.ig. to 7000 p.s.ig., preferably from 1500 p.s.ig. to 4000 p.s.ig. The time for the reaction can be varied considerably, generally being from about 20 minutes to 5 hours, and preferably from 0.5 to 1.5 hours. The tetraborane can be pyrolyzed as such, as shown by Examples XI and XII, or while in admixture with an inert gas, such as nitrogen, argon, helium, neon, xeon or krypton.

It is claimed:

1. A method for the production of decaborane in the substantial absence of non-volatile, higher molecular weight, solid boron hydrides which comprises heating a boron hydride consisting of tetraborane at a temperature of from 40° C. to 90° C. and at a pressure of from 1000 to 7000 p.s.i.g., and recovering decaborane in the substantial absence of non-volatile, higher molecular weight, solid boron hydrides.

2. A method for the production of decaborane in the substantial absence of non-volatile, higher molecular weight, solid boron hydrides which comprises heating a boron hydride consisting of tetraborane at a temperature of from 50° C. to 70° C. and at a pressure of from 1500 to 4000 p.s.i.g., and recovering decaborane in the substantial absence of non-volatile, higher molecular weight, solid boron hydrides.

References Cited in the file of this patent

Sidgwick: Chemical Elements and Their Compounds, vol. 1, page 346 (1950), University Press, Oxford.

Schechter et al.: Boron Hydrides and Related Compounds, pages 13, 25–27, 33, 37, January 8, 1951, declassified January 5, 1954, Dept. of Navy, Bureau of Aeronautics.

Schechter et al.: "Preparation of Pentaborane and the Evaluation of Handling Diborane and Pentaborane," Report No. MSA-9973-FR, Navy Contract NOa(s) 9973, pages 1–7, December 1, 1950, declassified May 11, 1954, Bureau of Aeronautics, Dept. of Navy.